United States Patent [19]

White et al.

[11] Patent Number: 5,119,538
[45] Date of Patent: Jun. 9, 1992

[54] METHOD OF MAKING A TEMPERATURE SENSOR

[75] Inventors: Lee A. White, Keller; Royal H. Sites, Plano, both of Tex.

[73] Assignee: Ranco Incorporated of Delaware, Wilmington, Del.

[21] Appl. No.: 565,656

[22] Filed: Aug. 10, 1990

[51] Int. Cl.⁵ .............................................. H01C 7/02
[52] U.S. Cl. ...................................... 29/612; 29/620; 29/621
[58] Field of Search ................ 29/610.1, 620, 621, 29/612; 338/195; 219/121.69

[56] References Cited

U.S. PATENT DOCUMENTS

| | | | |
|---|---|---|---|
| 2,885,524 | 5/1959 | Elsler | 29/621.1 |
| 3,820,239 | 6/1974 | Nagata | 29/612 |
| 3,865,742 | 2/1975 | Greenstein | 29/620 |
| 4,159,459 | 6/1979 | Sease et al. | 338/61 |
| 4,338,506 | 7/1982 | Geller et al. | 219/121.65 |
| 4,486,738 | 12/1984 | Sadlo et al. | 29/620 |
| 4,582,976 | 4/1986 | Merrick | 338/195 |
| 4,626,822 | 12/1986 | Melkeraaen | 338/195 |
| 4,665,377 | 5/1987 | Harpaintner | 29/620 |
| 4,670,734 | 6/1987 | Caddock | 338/61 |
| 4,881,057 | 11/1989 | Garcia et al. | 338/28 |

FOREIGN PATENT DOCUMENTS 3117957  11/1982  Fed. Rep. of Germany ...... 338/195

Primary Examiner—P. W. Echols
Attorney, Agent, or Firm—Watts, Hoffmann, Fisher & Heinke Co.

[57] ABSTRACT

A temperature sensor and fabrication technique for making the sensor. An insulating substrate supporting a conductive resistive pattern is laser trimmed until the pattern has a desired resistance. Back and forth movement of the laser is controlled at an automated laser trimming station. The laser trimmer compares the sensed resistance of the conductive resistance pattern with a sensor pattern that has already been precisely trimmed to a desired resistance and is used as a standard.

8 Claims, 3 Drawing Sheets

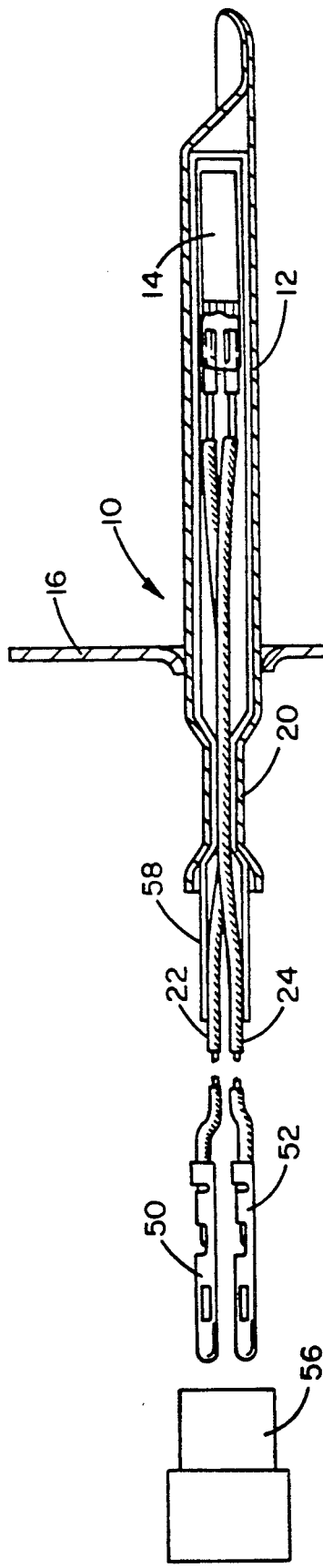
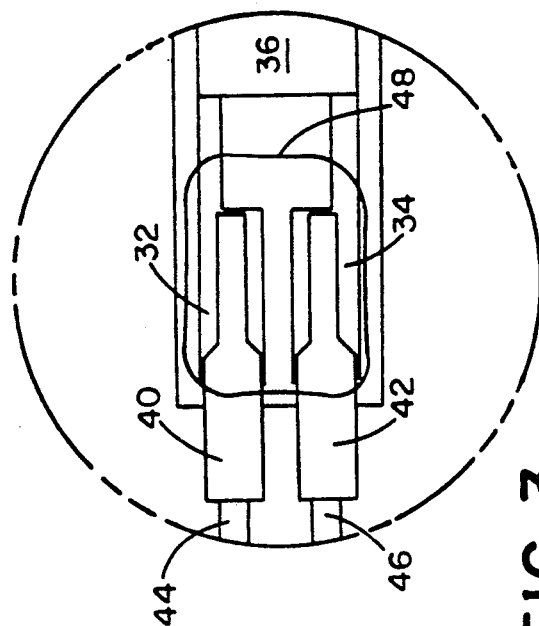
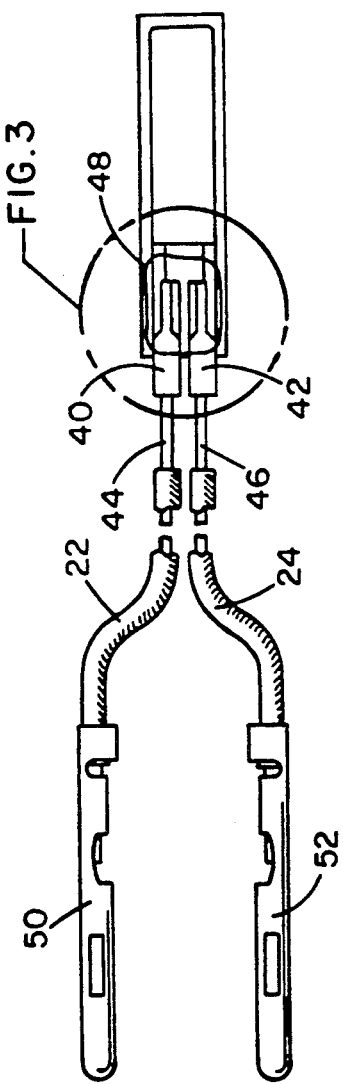

METHOD OF MAKING A TEMPERATURE SENSOR

FIELD OF THE INVENTION

The present invention concerns a fabrication technique for forming a temperature sensor.

BACKGROUND ART

It is well known in the prior art to fabricate a temperature sensor using a conductive material whose resistance changes with temperature. By determining the resistance of the sensor it is possible to determine the temperature of the environment in which the sensor is positioned. Such a technique is known, for example, for use in a temperature probe for monitoring oven temperature. The sensed temperature is used in a feedback or closed loop control circuit for maintaining the oven temperature at a desired setpoint.

U.S. Pat. No. 4,159,459 to Sease et al. discloses a thin film cylindrical resistor. A cylindrical insulating substrate has an electrically conductive coating which is selectively cut along an axial path to form a spiral disruption. This increases the resistance of the conductive material in a region between two metal contacts on the resistor. The cutting is preferably accomplished with a laser beam and as noted at column 3 of the '459 patent, "the degree of rotation while the laser beam is off may, of course, be varied to vary the gap in the spiral cut depending upon the size and the desired characteristics of the resistor."

U.S. Pat. No. 4,670,734 to Caddock discloses a thick film resistor fabrication technique having a substrate of insulating material which supports a thick film conductive resistor. A laser is used to form a zig-zag path of conductive material spaced by the insulating material. The shape of the zig-zag path is controlled to avoid inductive effects accompanying the energization of the path during use of the resistor.

U.S. Pat. No. 4,881,057 to Garcia et al. which issued Nov. 14, 1989 and is assigned to the assignee of the present invention discloses a temperature sensor. This sensor is used in conjunction with control apparatus for defrosting a refrigeration coil. Two thick film resistor elements are mounted on a substrate and a thermistor coupled to those elements to form a voltage divider. The resistance of the thermistor is determined at a reference temperature and the thick film resistor elements are precisely trimmed using a laser trimmer. The disclosure of the '057 patent to Garcia et al. is incorporated herein by reference.

DISCLOSURE OF THE INVENTION

The present invention concerns a temperature sensor fabrication technique. While monitoring the electrical resistance of a conductive region, a laser cuts across the conductive region until a predetermined resistance is achieved. The conductive region is then used in a temperature probe wherein the resistance of the conductive region is monitored to give an indication of the temperature of the probe.

In accordance with one method of the invention, a temperature sensor is fabricated by applying or attaching an electrically conductive organo-metallic material onto an insulating substrate to form a resistor element. While maintaining the conductive region at a control temperature the resistance of the conductive region is sensed as a laser trims the conductive region. When a desired final resistance value is achieved the trimming is stopped.

A preferred laser trimming process removes one or more narrow strips from the conductive region until the resistance of the region increases to the desired value. A preferred technique for monitoring the resistance is to compare the resistance of the region to the known resistance of an already accurately trimmed sensor.

BRIEF DESCRIPTION OF THE DRAWINGS

FIG. 1 is a partially sectioned elevation view of a probe assembly for monitoring oven temperature;

FIG. 2 is an enlarged plan view of a temperature sensing portion of the FIG. 1 probe assembly;

FIG. 3 is an enlarged plan view of a temperature sensor and electrical interconnections for energizing the sensor;

BEST MODE FOR PRACTICING THE INVENTION

Figure 4:
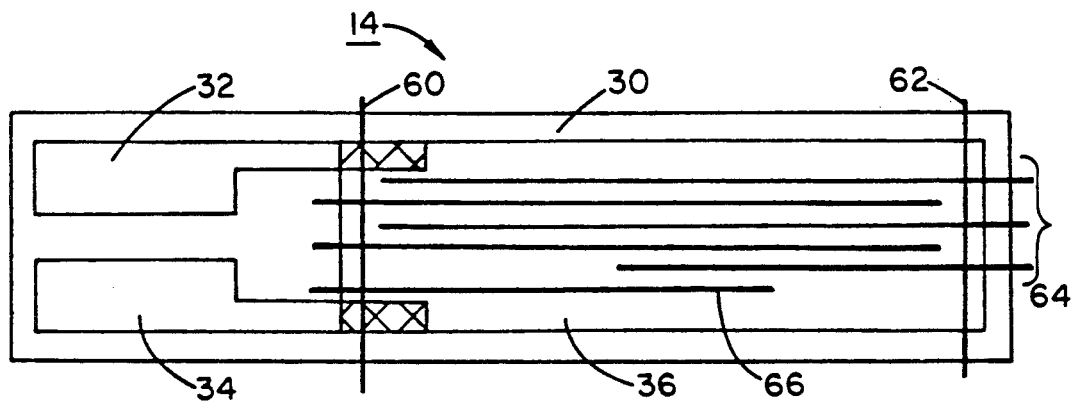
FIG. 4 is a plan view of the temperature sensor showing elongated parallel paths cut through a conductive material used to fabricate the sensor.

Turning now to the drawings, FIG. 1 discloses a probe assembly 10 for monitoring the temperature within a heating chamber of a stove or the like. The assembly includes a conductive sleeve 12 that encloses a temperature sensor 14 and positions the sensor within the chamber. A flange 16 connected (preferably by spot welding) to the sleeve 12 attaches the sleeve to an inner wall of the chamber defining structure of the stove. Signals corresponding to the temperature of the sensor 14 are routed through a wall of the stove by a strain relief 20 that accommodates two flexible conductors 22, 24.

The temperature sensor 14 includes an insulating ceramic substrate 30 supporting three conductive patterns 32, 34, 36 (see FIG. 4). The three conductive patterns 32, 34, 36 are affixed to the substrate 30 using thick film deposition techniques known in the prior art. A silk screen process is used to selectively deposit two conductive contact patterns 32, 34 onto the substrate. These two patterns are formed using a platinum/gold conductive paste and facilitate interconnection of the flexible conductors 22, 24 to the sensor.

A separate silk screen step deposits the pattern 36 to overlie small portions of the two contact patterns 32, 34. Once all three patterns are silk screened onto the substrate they are baked at a temperature of 850 degrees Celsius for a period of ten minutes The third pattern 36 is formed using an organo-metallic paste commercially available from Cermalloy, Union Hill Industrial Park, West Conshohocken, Penna. 19428 under the designation RP10001.

After the initial baking the pattern 36 has a very low resistance. (approximately 2 ohms) This resistance is increased to a value smaller than but within 90-95% of a desired final value by laser trimming as discussed in detail below. In one embodiment this initial approximation has a resistance of 950 ohms. The sensor substrate is then stabilization baked at 850 Celsius and a second laser trimming process is used to precisely define the resistance of the pattern 36 before the sensor 14 is mounted within the conductive sleeve 12.

As seen most clearly in FIGS. 2 and 3, two metal (preferably nickel) leads 40, 42 are parallel gap welded to the patterns 32, 34 and spot welded to exposed wire strands 44, 46 that extend beyond insulation of the conductors 22, 24. To maintain electrical engagement between the patterns 32, 34 and the leads 40, 42 a ceramic insulator 48 covers a narrow o necked down portion of the leads 40, 42. This insulator 48 increases the structural integrity of the engagement.

The conductors 22, 24 extend outside the oven cavity where opposite ends of the wire strands 44, 46 are electrically connected (by crimping) to two pin connectors 50, 52.

The conductors 22, 24 are constructed using a special fabrication technique. Twenty-four gauge nickel clad copper wire is insulated with two layers of fiberglass insulation. The insulation is approximately ¼ inch wide and is impregnated with mica flakes on a side of the fiberglass layer facing inward toward the wire. The mica is a heat insulator and avoids shorting of the copper wire that can occur when ordinary wire insulation is repeatedly heated and cooled. One layer of insulation is applied in a clockwise spiral and a second applied in a counterclockwise spiral. An additional layer of fiberglass insulation overlies the two spirally wound layers. The resulting structure resists cracking and shorting when it undergoes the wide temperature swings (approx 1000 degrees F.) experienced in the region of an over temperature sensor.

Extending through the strain relief 20 is a stranded fiberglass web 58 which covers the conductors 22, 24 and extends into the sleeve 12 and covers the end of the sensor 14. At an extreme end of the metal sleeve 12 a spoon crimp applied to the sleeve encloses the sensor 14 within a cavity defined by the metal sleeve. The pin connectors 50, 52 engage a female connector 56 for routing signals away from the sensor 14 to a control circuit for maintaining oven temperature.

During temperature monitoring, an electrical signal is applied across the two contacts 40, 42 electrically connected to the two patterns 32, 34. The current passing through the pattern 36 is determined by the resistance of the pattern and therefore gives an indication of the temperature within the cavity. In a preferred use of the sensor 14, a bridge circuit arrangement is used to determine the resistance of the pattern 36 as a known voltage is applied to the contacts 40, 42.

FIG. 4 is an enlarged plan view showing the conductive patterns 32, 34, 36 supported on the substrate 30. After the sensor 14 is baked the thickness of the pattern 36 is approximately 15 angstroms, a thickness which allows the pattern to be laser trimmed. The patterns 32, 34 are substantially thicker. Initially, the pattern 36 is laser trimmed at both ends along two generally parallel trim paths 60, 62 which cut through the pattern 36 but not the patterns 32, 34. The pattern 36 is then cut along an additional series of generally parallel paths 64 until an approximate desired resistance for the pattern 36 is achieved. After the stabilization bake of ten minutes, the final resistance is achieved by laser trimming along a final path 66.

During fabrication, an array 70 of like substrates (FIG. 5) having similarly oriented conductive patterns are trimmed in sequence using a single standard sensor having a specific resistance. In operation, the laser trimming station 100 monitors the resistance of the standard sensor and trims the conductive patterns 36 of each sensor in turn to cause each pattern to have a resistance equal to the resistance of the standard sensor.

Figure 5:
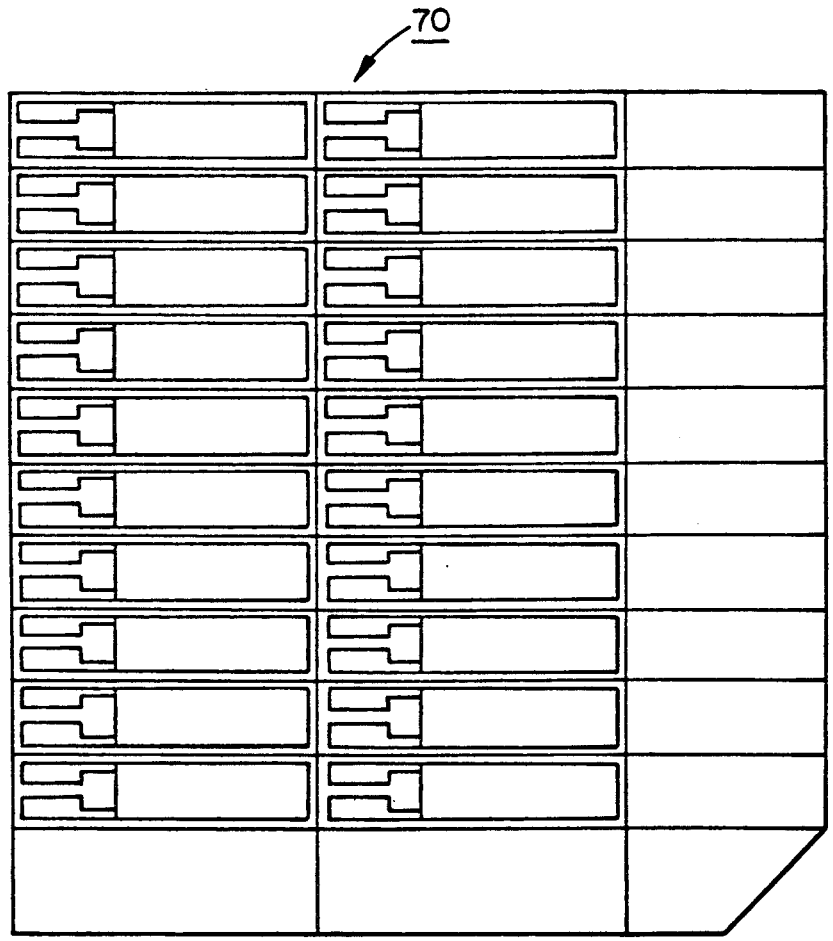
FIG. 5 is a plan view of an array of similarly constructed temperature sensors.

The single standard sensor and the array of substrates shown in FIG. 5 are maintained at a constant uniform temperature which in a preferred embodiment is room temperature. As disclosed in the '057 Garcia et al. patent, the sensors are calibrated to have a specific resistance at a temperature within the operating range of the sensor. If the sensors are all formed from the same organic metallic paste and their resistances vary with temperature in the same way, it is sufficient to define one standard and trim that standard at the standard temperature. Since the sensors to be fabricated, however, also have the same characteristics as the standard, the precision trimming step can be accomplished at a temperature other than the standard and in this instance the trimming is done at room temperature.

Figure 6:
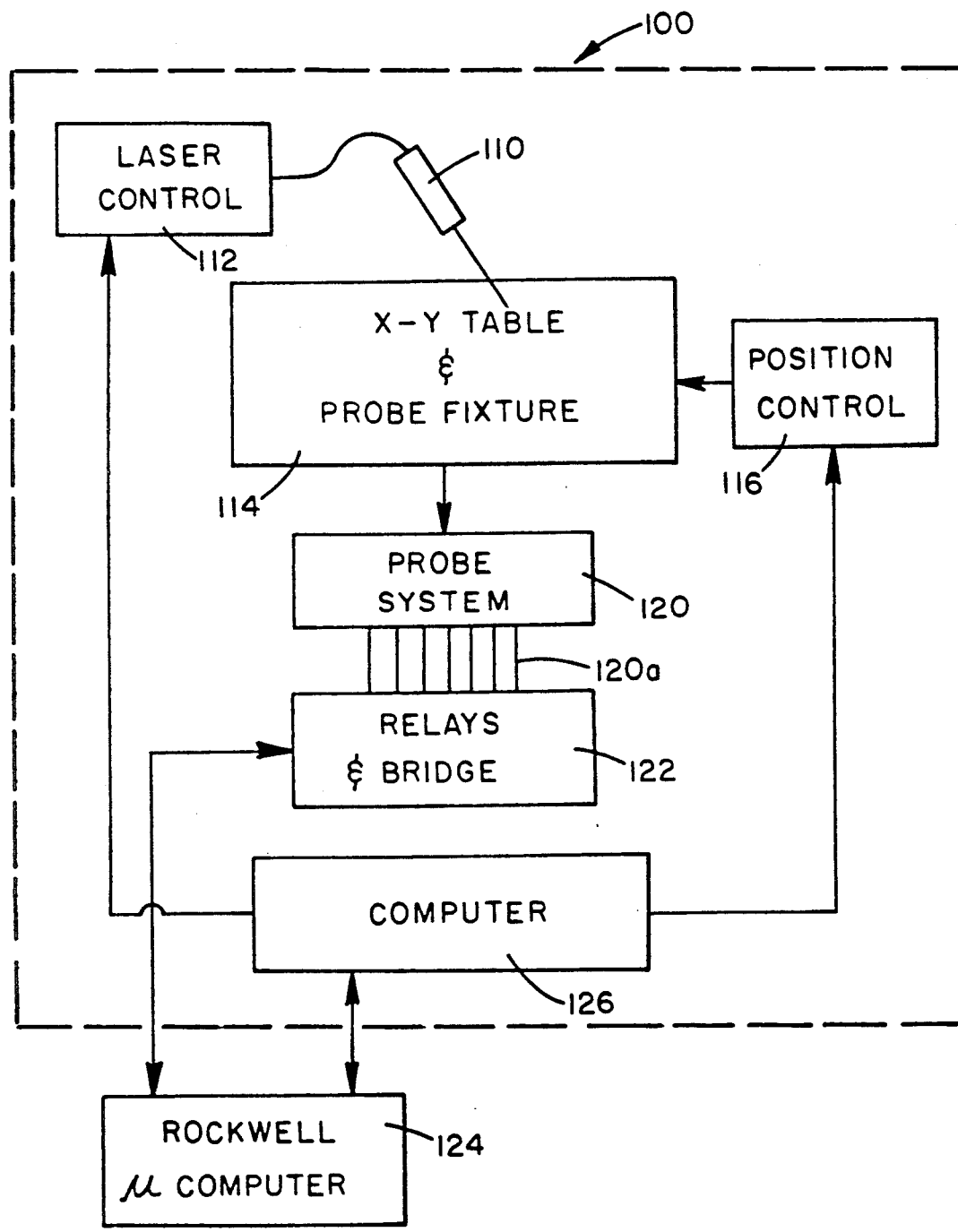
FIG. 6 is a schematic of a laser trimming station for controlling movement of a laser along controlled paths.

The trimming system 100 is schematically depicted in FIG. 6. The preferred trimming system 100 utilizes a Chicago laser systems CLS-33 laser trimming apparatus which includes a laser 110 and laser control 112 for turning the laser on and off and moving the laser beam across the surface of a table 114. The array of substrates depicted in FIG. 5 are positioned on the table 114 and a table position control 116 indexes the table in relation to the laser 110. Each substrate is positioned beneath the laser and then the laser is moved to intercept and burn away deposited material from a given substrate.

The resistance of each pattern 36 is monitored during the trimming operation to ensure a precise trimmed resistor value. A probe system 120 includes a fixture having two pairs of probe fingers, one pair engages the pattern to be trimmed and the second engages the pattern of the standard sensor. The probe contact fingers are coupled to conductors 120a routed away from the probe fixture to a relay and bridge circuit 122 for measuring the resistance across the probe fingers. A Rockwell microcomputer 124 selectively opens and closes relays to couple the probe fingers to a bridge circuit that senses the resistance of a selected resistor pattern across the fingers.

The Rockwell computer monitors the resistance measured by the bridge circuit 122 until the monolithic resistor element being trimmed has the same value as the precisely determined standard sensor. When this resistance value is measured the computer 124 signals a computer 126 to stop the trimming operation and initiate trimming of the next succeeding sensor.

The preferred laser trimming procedure for manufacture of precision temperature sensors has been described with a degree of particularity. It is the intent, however, that the invention include all modifications and alterations from the disclosed method and apparatus falling within the spirit or scope of the appended claims.

We claim:

1. A method of fabricating a temperature sensor comprising the steps of:
   a) forming a reference sensor that includes a reference resistor fabricated from an organo-metallic material that has a standard resistance at a reference temperature;
   b) applying two conductive contact patterns onto an insulating substrate at spaced-apart locations and also applying the organo-metallic material onto the insulating substrate to connect the two conductive contact patterns and then heating said organo-metallic material to form a temperature sensing resistor element thin enough to be laser trimmed;

c) maintaining said reference sensor and resistor element at a control temperature while measuring the resistance of said resistor element between the two conductive contact patterns; and d) laser trimming said resistor element to remove said organo-metallic material from the insulating substrate along controlled paths until the resistor element has a resistance equal to the resistance of the reference resistor at the control temperature.

2. The method of claim 1 wherein the laser trimming step is performed by removing one or more elongated narrow strips of resistive element material to increase the resistance between said two contacts until the desired resistance value is achieved.

3. The method of claim 1 wherein the applying step is performed by screening the organo-metallic paste onto the insulating substrate.

4. The method of claim 1 wherein the laser trimming is performed in two steps and the resistor element is heated before a final laser trimming step is performed to achieve the desired resistance.

5. The method of claim 1 additionally comprising the step of welding two metal leads to the two conductive contact patterns and strengthening the engagement between the two metal leads and the two conductive contact patterns by covering at least a portion of the two metal leads with a ceramic insulation material.

6. The method of claim 1 wherein the reference temperature and the control temperature are different temperatures.

7. A method of fabricating a temperature sensor comprising the steps of:

a) forming a reference sensor that includes a reference resistor fabricated from an organo-metallic material that has a standard resistance at a reference temperature;

b) applying a first paste of conductive material at spaced contact locations on an insulating substrate and also applying the organo-metallic paste onto the insulating substrate to connect the contact locations and heating said organo-metallic paste to form a temperature sensing resistor element thin enough to be laser trimmed;

c) maintaining said reference sensor and resistor element at a control temperature while measuring the resistance of said resistor element between the two contact locations; and d) laser trimming said resistor element along controlled paths to remove said organo-metallic material from the insulating substrate until the resistor element has a resistance equal to the resistance of the reference resistor at the control temperature.

8. The method of claim 7 wherein the reference temperature and the control temperature are difference temperatures.

* * * * *